United States Patent

Ballenger

[15] 3,664,487

[45] May 23, 1972

[54] ENDLESS HELICAL CONVEYER AND BELT

[72] Inventor: Carl H. Ballenger, 1751 Circle Road, Ruxton, Md. 21204

[22] Filed: May 23, 1969

[21] Appl. No.: 827,381

[52] U.S. Cl. ........................................................198/136
[51] Int. Cl. ..........................................................B65g 17/06
[58] Field of Search ........................198/136, 181–182; 34/147

[56] References Cited

UNITED STATES PATENTS

| 701,459 | 6/1902 | Aston | 198/136 X |
| 2,788,140 | 4/1957 | Becker | 198/136 X |
| 3,348,659 | 10/1967 | Roinestad | 198/136 |

Primary Examiner—Edward A. Sroka
Attorney—Beveridge and DeGrandi

[57] ABSTRACT

An endless conveyor having an endless flat link belt driven in two concentric helical paths by concentric rotary drums which engage the inner edges of the belt inwardly of the two helical paths to push the belt upwardly along one path crossing over at the top and downwardly along the other path. The belt links along the inner edge of the belt are collapsible to enable the belt to assume different curvatures while the links along the outer edge of the belt have a greater longitudinal dimension to accommodate the greater radius of curvature along the outer edge of the belt. Because the belt is driven along its inner edge and moves in a helical path, each link is pivoted about the inner edge in the forward direction of conveyance thus placing the outer edge of the belt under tension at all times during operation.

18 Claims, 12 Drawing Figures

PATENTED MAY 23 1972 3,664,487

INVENTOR
CARL H. BALLENGER

BY
Beveridge & De Grandi
ATTORNEYS

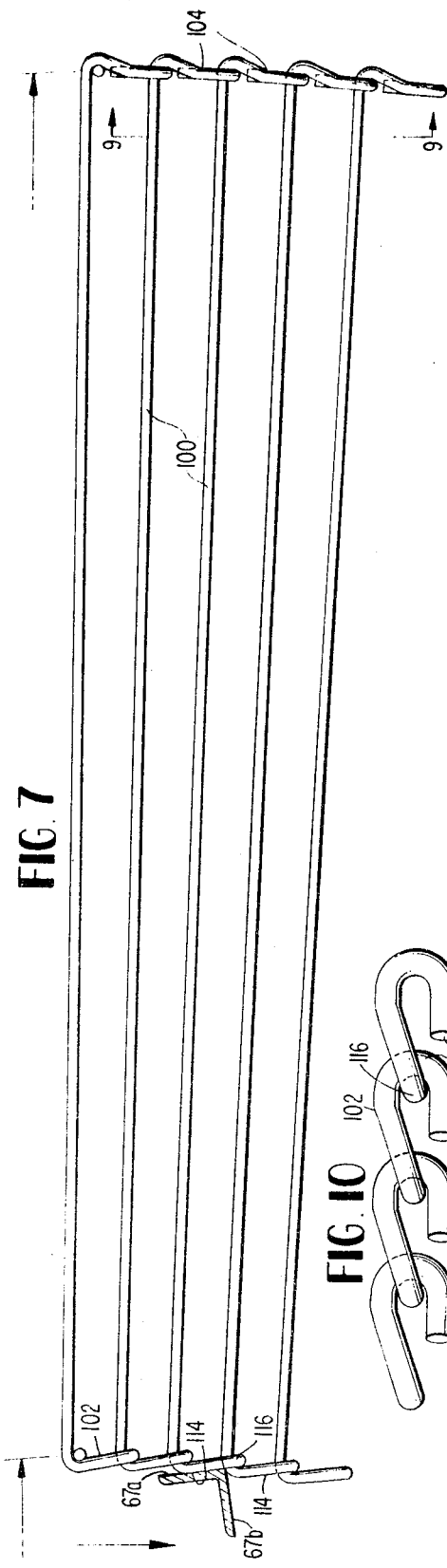
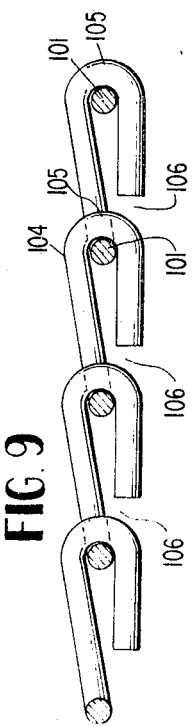
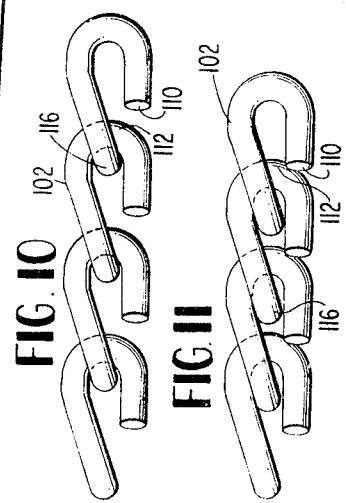
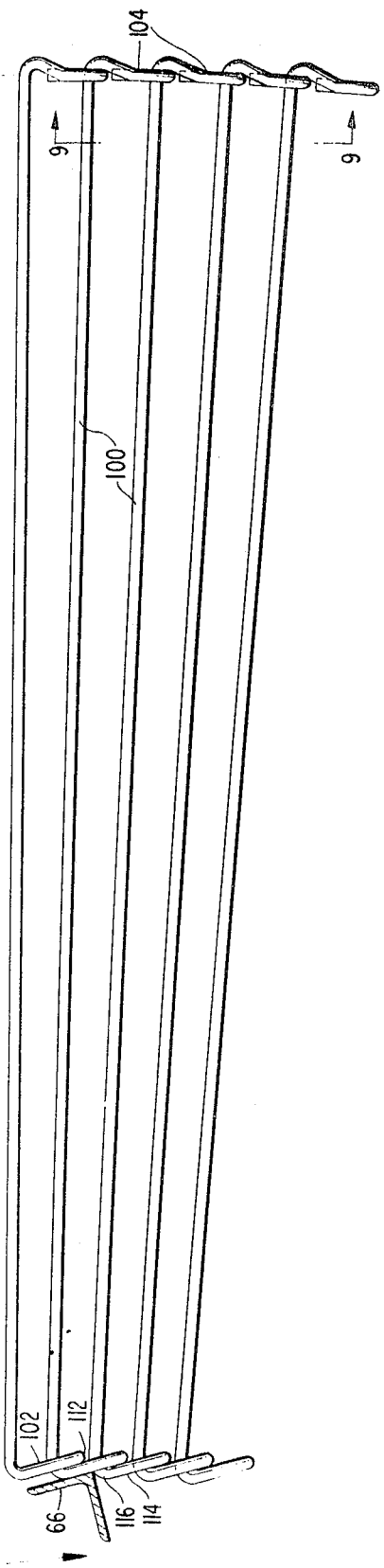

ENDLESS HELICAL CONVEYER AND BELT

SUMMARY OF OBJECTS AND INVENTION

The present invention relates to an endless helical conveyer and to a belt incorporated therein. Although one application of the conveyer is for moving bakery products such as bread loaves which have just been baked, through a cooling zone, it will be readily understood that the conveyer may be equally applied to advantage in other environments and that the invention is not restricted to the baking industry.

One of the objects of the present invention is to provide a new helical conveyer capable of conveying articles in ascending and descending helical paths.

A further object of the present invention is to provide such a helical conveyer which occupies relatively minimum space considering the length of the path of conveyance. Included herein is the provision of such a helical conveyer capable of conveying products upwardly and then downwardly or vice versa through two concentric helical paths.

A further object of the present invention is to provide such a helical conveyer which incorporates an endless link belt which helically ascends and descends substantially in horizontal planes. Included herein is the provision of a novel drive mechanism for driving the belt and which insures that the belt remains substantially flat during operation and with the links in its outer edge under tension at all times.

Yet another object of the present invention is to provide an improved link belt particularly suitable for use in such a helical conveyer.

The above objects are achieved in a conveyer including a vertical support structure including a first set of horizontally projecting supports arms spaced along a first helical path about a vertical axis; a second set of horizontally projecting support arms spaced along a second helical path surrounding the first path; and an endless flat link belt supported on the arms so that the belt extends helically along the first and second paths with cross over or transition sections of the belt extending between the helical paths at the top and bottom of the conveyer. The belt is driven helically up one path and down the other path by means of two concentric rotary drums, one drum being mounted within the first helical path for rotation about a vertical axis, and the other drum being mounted between the first and second helical paths for rotation about the same vertical axis. Extending vertically along the drums at circumferentially spaced locations thereon are a plurality of elongated angle members with their corners projecting outwardly from the drums to engage in recesses formed along the inner edge of the belt to drive the belt in a pushing manner upon rotation of the drums.

Rotation of the drums is achieved by sprocket chains secured to the drums respectively to extend in a horizontal plane circumferentially around the drums. Drive sprockets are engaged in the chains so that upon rotation of the drive sprockets, the motion will be transmitted to the drums to rotate the same for moving the belt along the helical paths.

The conveyer belt has a metallic link construction which in one embodiment includes a plurality of rods extending transversely of the belt and being linked together at their opposite ends to form the inner and outer edges of the belt. The links at one of the edges of the belt are larger than those at the opposite edge and thus constitute the outer edge of the belt when in use on the conveyer during which the outer edge of the belt assumes a greater radius of curvature than the inner edge. In addition, the links along the inner edge of the belt are extendible and collapsible towards or away from each other to permit the inner edge to conform to the different curvatures existing along the inner edges of the two helical paths. Moreover the links along the inner edge of the belt are formed with recesses for receiving the corners of the angle members on the drive drums thus enabling the belt to be positively driven by the drums without slippage. During operation, the belt rods are pivoted forwardly (in the direction of conveyance) about the inner edge of the belt by the drive angles on the drums whereby the outer edge of the belt is desirably maintained under tension throughout operation.

In use the conveyer may be continuously loaded with products on the lower run of one of the helical paths whereupon the loaded products will proceed upwardly along one helical path crossing over at the top of the conveyer and then descending along the other helical path to be removed at the bottom of the conveyer in any suitable manner.

Other objects and advantages of the present invention will become apparent from the following more detailed description taken in conjunction with the attached drawings in which:

FIG. 7 is an enlarged, fragmental plan view of a section of the belt showing the inner edge thereof in extended or uncollapsed condition;

FIG. 8 is a view similar to FIG. 7 but with the inner edge of the belt in a collapsed condition;

FIG. 9 is an enlarged end view of another belt section taken along lines 9 — 9 of FIG. 7;

FIG. 10 is an enlarged end view of the inner edge of the belt as shown in FIG. 7;

FIG. 11 is an enlarged end view of the inner edge of the belt as shown in FIG. 8.

DETAILED DESCRIPTION

Figure 1:
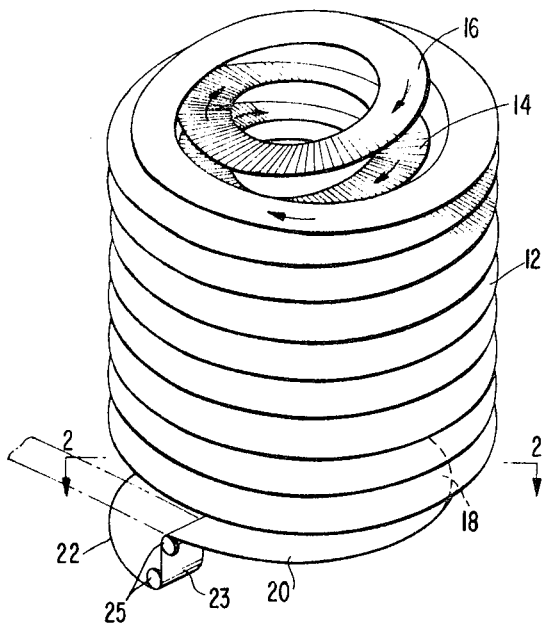
FIG. 1 is a diagrammatic perspective view of a helical coneyer embodying the present invention.

Referring to the drawings in detail, FIG. 1 diagrammatically shows a helical conveyer 10 embodying the present invention and including an outer helical path designated 12 and an inner helical path designated 14 concentric to the outer path 12. The inner and outer helical paths 12 and 14 are defined by an endless movable belt which will be described subsequently in more detail. At the top and bottom ends of the conveyer, helical paths 12 and 14 are interconnected by transitional sections 16 and 18 of the belt respectively. Thus at the top end of the belt or path, the transitional section 16 lessens in diameter while curving inwardly and downwardly in a helical manner to merge into the inner helical path 14. At the bottom of the conveyer, transitional section 18 gradually increases in its diameter while curving outwardly to merge into the outer helical path as shown in FIG. 2.

The lower run or loop of the outer helical path 12 is formed in two sections 20 and 22 lying at different elevations and interconnected by a vertical section 23 as shown in FIG. 1. Movement of the belt through sections 20, 23 and 22 is guided by vertically spaced rollers 25 over and under which the belt travels. Moving clockwise in the direction of travel as indicated in FIG. 2, after leaving section 22, the belt rises through a vertical section 26 diagrammatically opposite vertical section 23 after which the belt continues along a helical path upwardly through the successive loops or convolutions which form the outer helical path 12.

Figure 2:
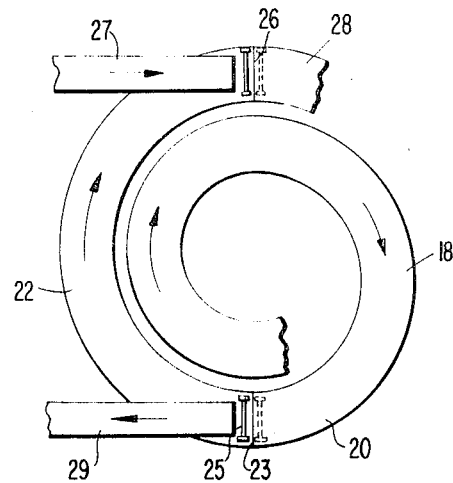
FIG. 2 is a fragmental, plan view taken generally along lines 2 — 2 of FIG. 1 illustrating a bottom section of the conveyer and associated feeding and unloading conveyers for supplying and removing products from the helical conveyer.

In the shown embodiment, the products or articles (not shown) to be conveyed are loaded in any suitable manner such as by a conveyer 27 on the lower belt section 28 into which vertical section 26 feeds as shown in FIG. 2. Conveyer 27 may be an endless belt conveyer with its belt lying in he same plane and terminating at one end adjacent to section 28 so as to discharge articles directly on section 28 to begin their helical conveyer ascent through outer path 12.

After the articles are conveyed to the top of the conveyer and then downwardly through the inner helical path 14, they are unloaded from lower belt section 20 by means of a second endless conveyer 29 similar to loading conveyer 27. Unloading conveyer 29 is positioned with its inlet end adjacent the end of section 20 so that articles will be discharged onto conveyer 29 as the belt moves downwardly from section 20 into section 23.

Figure 3:
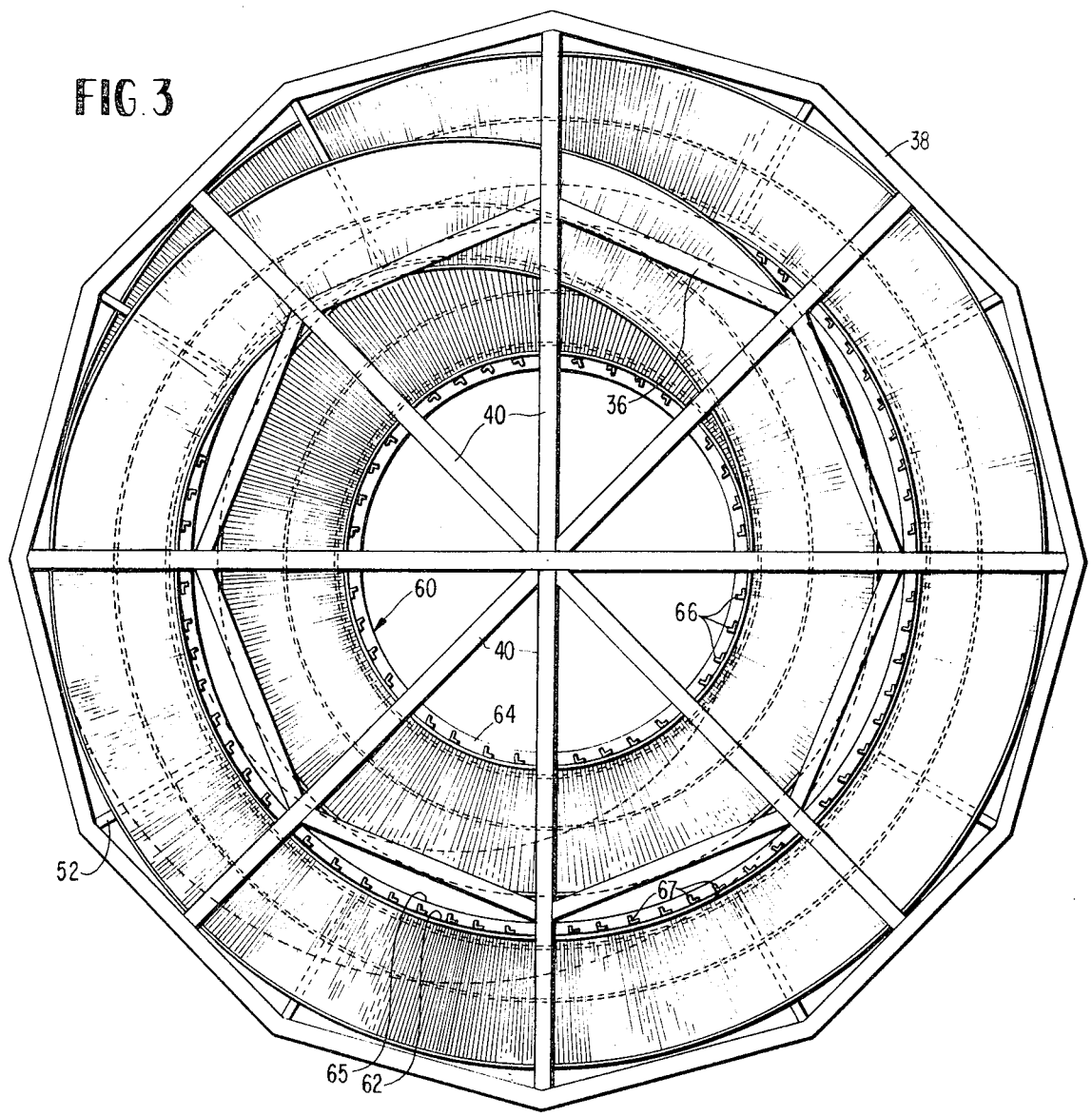
FIG. 3 is a plan view of the conveyer.
Figure 6:
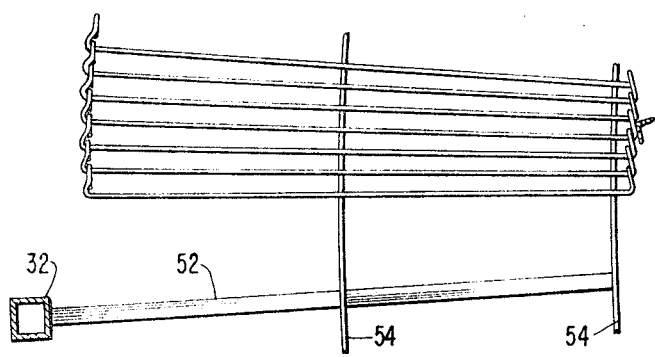
FIG. 6 is a fragmental, cross sectional view taken generally along lines 6 — 6 of FIG. 4 illustrating a section of the conveyer belt and its underlying support.
Figure 4:
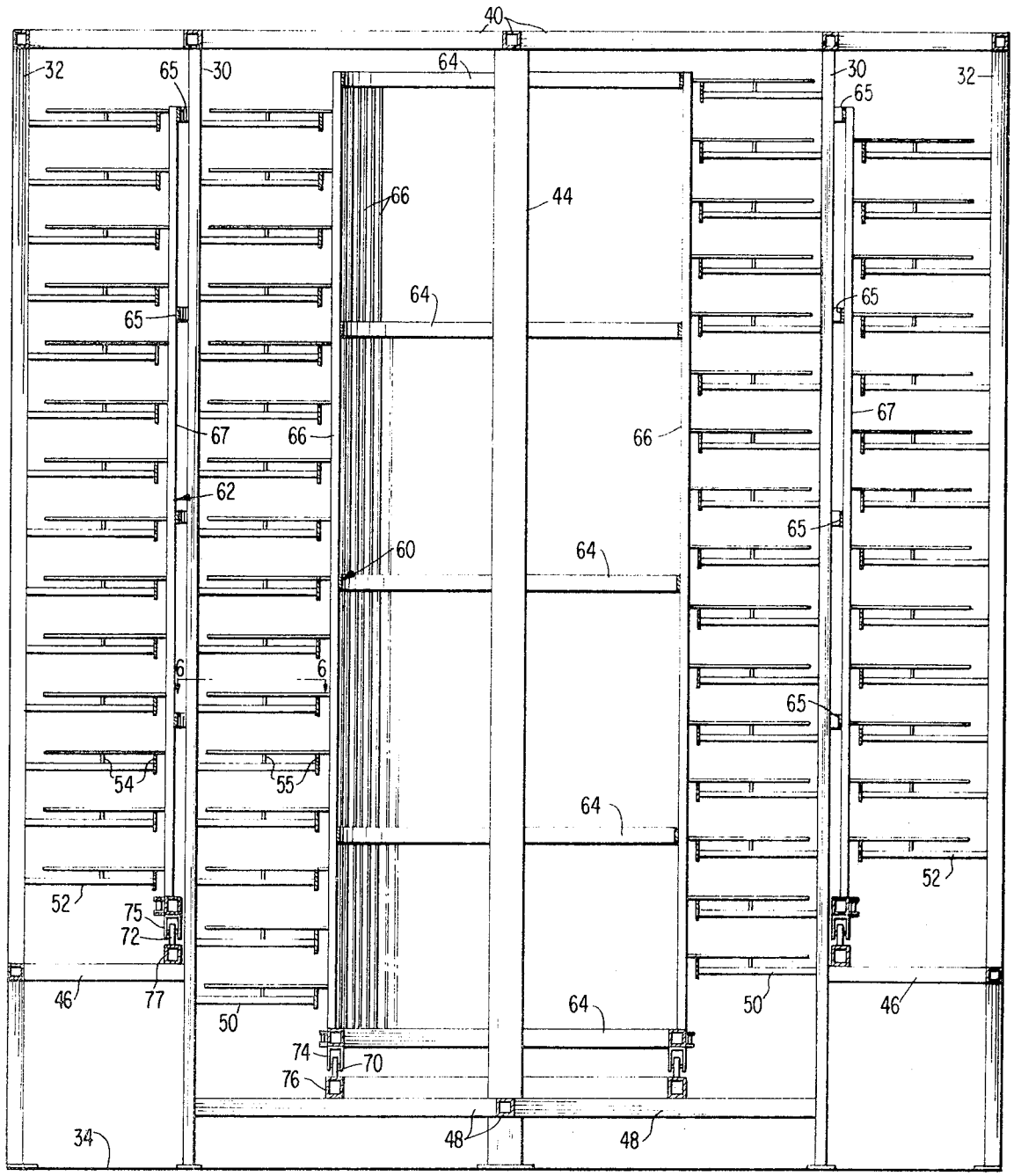
FIG. 4 is a vertical cross sectional view of the conveyer.

Referring to FIG. 4, the conveyer belt is supported throughout its movement by means of a frame including inner and outer vertical support members 30 and 32 which may be formed by the illustrated rectangular steel tubing and which are anchored at the ground level indicated by 34. The vertical support members in each set are angularly spaced from each other about the helical axes while being interconnected by chordal horizontal support members 36 and 38 (see FIG. 3). In addition, the vertical support members in each set are interconnected by radial support members 40 which extend from a center post or column 44 outwardly through chordal members 36 to chordal members 38. At the bottom of the conveyer, the outer and inner vertical support members are interconnected by horizontal support members 46 while the inner vertical support members are connected by horizontal members 48 which radiate from center column 44.

The inner and outer helical paths of the belt are governed and supported by horizontal support arms 50, 52 which project radially inwardly from the inner and outer vertical support members 30, 32 at helically spaced positions about the center post 44 through which the common helical axis of both helical paths extends. Horizontal support arms 50, 52 are secured at their outer ends to vertical support members 30, 32 respectively with their inner ends being free such that horizontal support arms 50, 52 are cantilevered from the vertical support members. Interconnecting successive horizontal support arms 50, 52 in each of the helical paths are two pairs of runners 54 and 55 which extend helically about the vertical helical axis. The runners in each pair 54, 55 are equally spaced from each other throughout their extent, and the conveyer belt is adapted to horizontally rest on runners 54, 55 during its movement throughout the conveyer. If desired, a nylon or teflon liner or any other low friction surface (not shown) may be provided on the top surfaces of runners 54, 55 to minimize sliding friction on the belt.

The conveyer belt is driven by engagement along its inner edge through means of two concentric drive drums or cylinders generally designated 60 and 62. Drum 60 is located inwardly of the inner helical path 14 while the other drum 62 is located outwardly of drum 60 between helical paths 12 and 14 as indicated in FIGS. 3 and 4. Drums 60, 62 have a generally cylindrical frame comprised of plurality of vertically spaced concentric circular frame portions 64 and 65; and elongated vertical angle members 66 and 67 extending throughout the length of the drums while being secured to the circular frame portions 64, 65.

Drums 60 and 62 are mounted for rotation about the vertical helical axis by means of rollers 70, 72 suitably rotatably mounted through channels 74, 75 to the bottom ends of the drums. Drum rollers 70, 72 are on circular tracks 76, 77 formed by any suitable means. In the shown embodiment, the inner drum track 76 is supported on the radial support members 48 while the outer drum track 77 is supported on horizontal support members 46 above the elevation of track 76. Any suitable track arrangement may be provided in this regard. Moreover if desired, inner drum 60 may be secured to a central rotatable drive post coinciding with the axis of the helical path in which case rollers 70 would be omitted along with the fixed central post support 44 for the frame.

Figure 5:
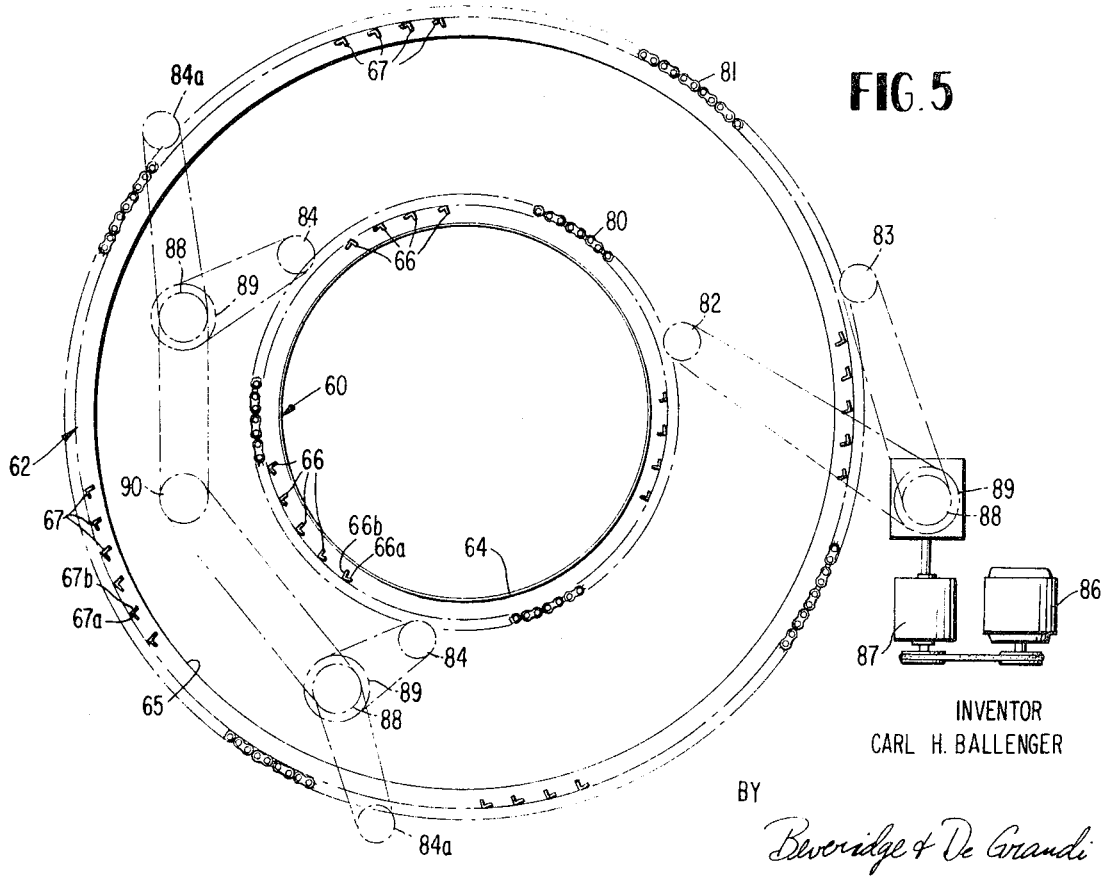
FIG. 5 is a transverse cross sectional view taken across bottom portions of the conveyer illustrating the drive mechanism for the conveyer.

As will be described subsequently in more detail, vertical angle members 66, 67 are employed to drive the belt. For this reason, vertical angle members 66, 67 are secured in the drum frames with their corner edges projecting radially outwardly so as to be engageable in complimentary recesses formed in the inner edge of the belt as will be described. Sufficient angles are provided in each of the drums at appropriate circumferential spacings depending on the size of the drums, the type of belt employed, etc. For example in one embodiment wherein the inner and outer drums are about 72 inches and 132 inches in diameter respectively, the angles may consist of one inch structural steel right angles with the inner drum having approximately 90 angles equally spaced from each other throughout the circumference, and the outer drum having 150 angles equally spaced about the circumference thereof. Moreover the angles 66, 67 are each positioned on the drum with their legs 66a, 66b, 67a, 67b extending at different angles to a line tangent to the drum circumference and passing through the corners of the angles. Referring to FIGS. 5 and 7, it will be seen that leg 67a extends at an angle of about 5° (degrees) to a tangent line drawn through the corner of angle 67. This positioning of the angles provides effective positive engagement with the inner edge of the belt insuring that the belt will be driven smoothly and without slippage.

Figure 12:
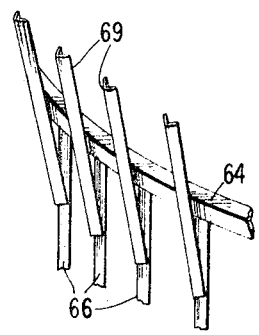
FIG. 12 is a fragmental perspective view of a top portion of a drive cylinder which drives the belt during transition between two helical paths in the conveyer.

In order to insure that tension is maintained on the belt when traveling through the upper transition section 16 between the inner and outer helical paths, a plurality of drive angles 69 are secured to the upper section of the inner drum 60 to project upwardly and outwardly at an incline as shown in FIG. 12. Drive angles 69 engage the inner edges of the belt as it moves through the transition section 16 to maintain as much drive continuity and support as possible on the belt. Drive angles 69 may be secured in any suitable manner to angles 66 and/or circular frame member 64.

Referring now to FIG. 5, the drive drums 60 and 62 in the illustrated embodiment are rotated through means of sprocket chains 80 and 81 respectively secured to the outer sides thereof to extend in a horizontal plane throughout the circumference of the drums. Drive sprockets 82 and 83 are suitably mounted for rotation about a fixed vertical axis and in mesh with sprocket chains 80 and 81 respectively to drive the drums upon rotation of the sprockets. Any suitable number of idler sprockets 84 and 84a may also be provided in mesh with chains 80 and 81 to insure that the drums are maintained in proper vertical alignment for rotation about the helical axis. A motor 86 operating through a gear reducer 87 is employed to drive sprockets 82 and 83 at different speeds through sprockets 88, 89 trained to sprockets 82, 83 respectively. Sprockets 82 and 83 are of different sizes in order to produce the required different speeds of rotation of drums 60, 62 so that the speed of the outer edge of the belt on the small drum equals the speed of the outer edge of the belt on the large drum. By equating the ratio between the perimeters of the small and large drum to the ratio between the sprocket diameters plus the width of the belt, the diameters of the sprockets 88, 89 can be calculated; it being understood that the drum perimeters and the width of the belt are known factors. Idler sprockets 84 and 84a are also trained to different size sprockets 88, 89 which are of the same size as sprockets 88, 89 associated with drive sprockets 82 and 83. Moreover sprockets 88, 89 are trained to a conveyer sprocket 90 which may be positively driven if desired.

Referring now to FIG. 7, the illustrated belt includes a plurality of rods 100 made from steel or any other suitable material extending transversely of the belt and being spaced from each other in the longitudinal direction of the belt. Rods 100 are interconnected to each other at their opposite ends by means of links 102 and 104 integrally formed therewith. Links 104 at the outer edge of the belt are U-shaped or hook shaped to receive the ends 101 of the adjacent rods in the bite or bend sections 105 thereof. It will be noted from FIG. 9 that small spaces 106 exist between the extremities of the outer links 104 and the adjacent bite sections 105 of the next adjacent link. Consequently rods 100 at their outer ends may undergo only a very limited amount of collapsing or extendible movement. In the position illustrated in FIGS. 7 and 8, outer links 104 are in their fully extended or tensioned position which they always occupy when the belt is in actual operation in the helical conveyer. Although not shown, outer links 104 may be constructed so that they are not collapsible at all relative to each other. This is because the outer links are always under tension when in actual use as will be explained below. In one specific embodiment of a belt wherein the width of the rods (belt width) is about 23 inches, the pitch of each outer link 104 is about 1 inch.

Links 102 which form the inner edge of the belt have a smaller longitudinal dimension than outer links 104. Moreover inner links 102 are made to be collapsible from an extended position shown in FIG. 10 to a retracted or fully collapsed position shown in FIG. 11. In the specific belt embodiment described above, inner links 102 have a pitch of about one-half inch when fully collapsed and a pitch of about three-quarters inch when fully extended. The collapsibility of the inner links 102 enables the belt to adjust to the different diameters of drums 60 and 62. When traveling about the outer drum 62, the inner links 102 may assume an extended position which may be short of the fully extended position shown in FIG. 7. Similarly, when traveling about the inner drum 62, inner links 102 may assume a collapsed position which may be short of the fully collapsed position.

In the specific type of belt disclosed, the collapsibility of the inner links 102 is achieved in manufacture by bending them laterally inwardly of the belt or (towards the outer links) relative to belt rods 100 so that adjacent links 102 may slide on and relative to each other without interference between the link extremities 110 and the adjacent bite portions 112. This is illustrated in FIGS. 8 and 11 wherein inner links 102 are in collapsed condition as opposed to their extended position shown in FIG. 10.

In addition the inward bending of inner links 102 also provides a plurality of substantially right angled recesses 114 between successive links which are employed to receive drive angles 66 and 67 on the drums for moving the belt. It will be seen from FIGS. 7 and 8 that the corners of drive angles 66, 67 engage positively within recesses 114 so that upon rotation of the drums, the drive angles will push the inner edge of the belt forwardly without slippage.

In addition, the force imposed on the inner ends of rods 100 at recesses 114 by angles 66 and 67 will cause the rods to pivot forwardly in the direction of belt travel about their inner ends at bite section 116 thus causing the outer ends of rods 100 to move forwardly. The result is that the outer edge of the belt will be under tension, that is with the outer links 104 fully extended throughout operation of the conveyer. This will serve to maintain the belt in the proper flat or horizontal position without slack to facilitate effective drive of the belt.

Although one specific belt has been shown and described it should be understood that the invention encompasses use of any link or other belt wherein the outer edge of the belt has a greater radius of curvature than the inner edge of the belt and wherein the inner edge of the belt is collapsible and has a plurality of sharply defined recesses for receiving driving members which not only are capable of moving the belt but also in such a manner whereby the outer edge of the belt is always under tension.

Moreover although in the illustrated embodiment, the belt is driven upwardly along the outer helical path and downwardly along the inner helical path in the preferred embodiment this is reversed so that the belt is driven upwardly along the inner path and downwardly along the outer path. In this manner, only one third of the total belt weight is moved upwardly inasmuch as the inner path obviously requires less belting than the outer path. Thus the preferred embodiment, does not require as much driving force for moving the belt, thereby enabling a smaller motor to be employed.

In addition, the preferred embodiment may employ annular sprockets rather than the chains disclosed in the illustrated embodiment.

What is claimed is:

1. For use on a helical conveyer to be movable upwardly about a first helical path and then downwardly about a second helical path concentric to the first helical path, a conveyer belt comprising a plurality of elongated cross members extending transversely of the belt and spaced in the longitudinal direction of the belt, the belt having a longitudinally extending side edge to form the inner edge of the belt when in use on the helical conveyer and a second longitudinally extending side edge spaced transversely from said first side edge by said cross members to form the outer edge of the belt when in use on the helical conveyer, a first set of links interconnecting the ends of the cross members at said first side edge and permitting the ends of the cross members to move towards and away from each other to permit the belt to collapse or expand along said first side edge, a second set of links interconnecting the ends of the belt at said second side edge thereof, said first set of links each having a longitudinal dimension less than that of each of said second links, said first set of links being dimensioned and shaped to permit adjacent links to move towards and away from each other in the longitudinal direction of the belt a substantial distance relative to each other to permit the inner edge of the belt to assume different curvatures during use on the helical conveyer, and means defining a plurality of relatively sharp angled recesses adjacent each of the links in the first set for receiving in positive engagement rotating angled drive members on the helical conveyer whereby the belt may be positively driven by mechanical pushing engagement along its inner edge.

2. The conveyer belt defined in claim 1 wherein said second set of links are each formed such that they are essentially non-collapsible relative to each other in the longitudinal direction of the belt.

3. An endless conveyer comprising in combination; support means defining concentric helical paths including an inner path and an outer path surrounding the inner path, an endless belt extending helically along said paths and including transitional belt portions extending between said inner and outer paths at top and bottom end portions of the conveyer, and means for driving said belt along said paths such that the belt helically ascends along one path and descends along the other, and wherein said paths have a common vertical axis, and
wherein said belt has inner and outer side edges made from links and wherein the links along the inner edges of the belt are collapsible to enable the inner edges of the belt to assume different curvatures when traveling along said helical paths, and
wherein said belt has a plurality of means defining recesses extending along the inner side edge of the belt and wherein said drive means includes positive drive elements engaged in said recesses for pushing the belt along said paths.

4. The conveyer defined in claim 3 wherein the links at said inner edges of said belt are dimensioned less than the links at the outer side edges of the belt.

5. The conveyer defined in claim 3 wherein said means for driving the belt drives the belt helically upwardly along said inner path and helically downwardly along said outer path.

6. The conveyer defined in claim 3 wherein said drive means further includes a first generally cylindrical drive means mounted for rotation about said axis inwardly of said inner helical path, and a second generally cylindrical drive means mounted for rotation between said inner and outer helical paths, and wherein said positive drive elements are fixed to said cylindrical drive means and extend vertically therealong to be rotatable therewith while being in engagement with said recesses at the inner edge of said belt to drive the belt upon rotation of said cylindrical drive means.

7. The conveyer defined in claim 6 wherein said positive drive elements are elongated angle members secured to said cylindrical drive means with their corners exposed to be received in the recesses of said belt.

8. The conveyer as defined in claim 7 wherein said angle members each have legs extending at different angles to a line tangent to the periphery of the cylindrical drive means and passing through the corner of the angle member.

9. The conveyer as defined in claim 7 wherein said angle members extend throughout the length of said cylindrical drive means, and wherein the drive angles in said first cylindrical drive means include top portions which extend outwardly and upwardly to engage the inner edge of the transitional belt portion at the top of the conveyer.

10. The conveyer defined in claim 6 wherein said support means includes a first set of vertical stationary support members angularly spaced about said vertical axis and being located between said inner and outer helical paths, and a second set of vertical stationary support members circumferentially spaced about said vertical axis and positioned outwardly of said outer helical path, and a plurality of support arms secured to said vertical support members in said first and second set and extending radially inwardly towards said vertical axis to define said inner and outer helical paths with the belt being engageable thereon.

11. The conveyer defined in claim 10 wherein said support means further includes helical runners secured to said arms in said first and second sets and extending helically throughout said inner and outer paths in supporting engagement under the belt.

12. The conveyer defined in claim 6 wherein said drive means further includes first and second sprocket chains secured to said cylindrical drive means respectively and extending circumferentially thereof, and first and second sprockets engaged in said chains respectively to drive said cylindrical drive means said first and second sprockets having different sizes to drive said first and second cylindrical drive means at different speeds.

13. The conveyer defined in claim 6 further including inner and outer concentric stationary circular tracks concentrically underlying said first and second cylindrical drive means, and rollers mounted at the bottoms of said first and second cylindrical drive means and engaged on said tracks.

14. For use on a helical conveyer to be movable along a helical path, a conveyer belt comprising a plurality of elongated cross members extending transversely of the belt and spaced in the longitudinal direction of the belt, the belt having a longitudinally extending side edge to form the inner edge of the belt when in use on the helical conveyer and a second longitudinally extending side edge spaced transversely from said first side edge by said cross members to form the outer edge of the belt when in use on the helical conveyer, a first set of links interconnecting the ends of the cross members at said first side edge and permitting the ends of the cross members to move towards and away from each other to permit the belt to collapse or expand along said first side edge, a second set of links interconnecting the ends of the belt at said second side edge thereof, said first set of links being dimensioned and shaped to permit adjacent links to move towards and away from each other in the longitudinal direction of the belt a substantial distance relative to each other to permit the inner edge of the belt to assume different curvatures during use on the helical conveyer, and means defining a plurality of relatively sharp angled recesses adjacent each of the links in the first set for receiving in positive engagement rotating drive members on the helical conveyer whereby the belt may be positively driven by mechanical pushing engagement along its inner edge, said first set of links each including a hooked shaped portion fixed to an associated cross member and receiving a next adjacent cross member to interconnect said cross members, said hooked shaped portions extending inwardly toward the center of the belt at an acute angle relative to the associated cross member such that the adjacent hooked shaped portions are slidable relative to and along each other into collapsed positions.

15. An endless conveyer comprising in combination; support means defining a helical path, an endless belt extending helically along said path, and drive means for driving said belt along said path such that the belt helically moves along said path, and said belt comprising a plurality of elongated cross members extending transversely of the belt and spaced in the longitudinal direction of the belt, the belt having a longitudinally extending side edge to form the inner edge of the belt when in use on the helical conveyer and a second longitudinally extending side edge spaced transversely from said first side edge by said cross members to form the outer edge of the belt when in use on the helical conveyer, a first set of links interconnecting the ends of the cross members at said first side edge and permitting the ends of the cross members to move towards and away from each other to permit the belt to collapse or expand along said first side edge, a second set of links interconnecting the ends of the belt at said second side edge thereof, said first set of links being dimensioned and shaped to permit adjacent links to move towards and away from each other in the longitudinal direction of the belt a substantial distance relative to each other to permit the inner edge of the belt to assume different curvatures during use on the helical conveyer, and means defining a plurality of relatively sharp angled recesses adjacent each of the links in the first set for receiving in positive engagement the rotating drive means on the helical conveyer whereby the belt may be positively driven by mechanical pushing engagement along its inner edge, said first set of links each including a hooked shaped portion fixed to an associated cross member and receiving a next adjacent cross member to interconnect said cross members, said hooked shaped portions extending inwardly toward the center of the belt at an acute angle relative to the associated cross member such that the adjacent hooked shaped portions are slidable relative to and along each other into collapsed positions.

16. The conveyer defined in Claim 15 wherein each hooked shaped portion and its associated cross member define a recess.

17. The conveyer defined in claim 15 wherein said drive means includes a generally cylindrical drive means rotatable about a vertical axis and said drive elements are angles fixed in angularly spaced relationship about the periphery of said cylindrical means.

18. The conveyer defined in claim 15 wherein said positive drive elements are elongated angle members secured to said cylindrical drive means with their corners exposed to be received in the recesses of said belt.

* * * * *